United States Patent
Sachs (10) Patent No.: US 10,367,852 B2
(45) Date of Patent: Jul. 30, 2019

(54) MULTIPLEXED DEMAND SIGNALED DISTRIBUTED MESSAGING

(71) Applicant: Swim.IT Inc., San Jose, CA (US)

(72) Inventor: Christopher David Sachs, Sunnyvale, CA (US)

(73) Assignee: Swim.IT Inc., San Jose, CA (US)

( * ) Notice: Subject to any disclaimer, the term of this patent is extended or adjusted under 35 U.S.C. 154(b) by 174 days.

(21) Appl. No.: 15/256,112

(22) Filed: Sep. 2, 2016

(65) Prior Publication Data

US 2017/0070457 A1   Mar. 9, 2017

Related U.S. Application Data

(60) Provisional application No. 62/214,786, filed on Sep. 4, 2015.

(51) Int. Cl.
| | |
|---|---|
| *G06F 16/22* | (2019.01) |
| *H04L 29/06* | (2006.01) |
| *G06Q 30/02* | (2012.01) |
| *H04L 12/721* | (2013.01) |
| *H04L 12/58* | (2006.01) |
| *H04L 29/12* | (2006.01) |
| *H04L 29/08* | (2006.01) |

(Continued)

(52) U.S. Cl.
CPC ............ *H04L 63/205* (2013.01); *G06F 16/22* (2019.01); *G06F 21/121* (2013.01); *G06F 21/31* (2013.01); *G06F 21/604* (2013.01); *G06F 21/6254* (2013.01); *G06Q 30/0277* (2013.01); *H04L 45/70* (2013.01); *H04L 51/04* (2013.01); *H04L 51/12* (2013.01); *H04L 51/14* (2013.01); *H04L 61/2069* (2013.01); *H04L 63/0227* (2013.01); *H04L 67/101* (2013.01); *H04L 67/104* (2013.01); *H04W 12/02* (2013.01); *G06F 2221/2141* (2013.01); *G06F 2221/2149* (2013.01); *H04L 43/0894* (2013.01); *H04L 47/125* (2013.01); *H04L 51/34* (2013.01); *H04L 61/1541* (2013.01); *H04L 63/0407* (2013.01)

(58) Field of Classification Search
None
See application file for complete search history.

(56) References Cited

U.S. PATENT DOCUMENTS

| | | |
|---|---|---|
| 6,275,824 B1 | 8/2001 | O'Flaherty |
| 8,181,254 B1 | 5/2012 | Kay |

(Continued)

FOREIGN PATENT DOCUMENTS

| | | |
|---|---|---|
| WO | 2007147320 A1 | 12/2007 |
| WO | 2014205431 A2 | 12/2014 |

OTHER PUBLICATIONS

Fink et al., "Application of Machine Learning and Crowdsourcing to Detection of Cybersecurity Threats", Feb. 2011, Proceedings of the DHS Science Conference Fifth Annual University Network Summit, Carnegie Mellon University.

(Continued)

*Primary Examiner* — Esther B. Henderson
(74) *Attorney, Agent, or Firm* — Haverstock & Owens LLP (57) ABSTRACT

A multiplexed demand signaled distributed messaging (MDSDM) system and method enables high capacity real-time messaging between application services by generating and utilizing innovative techniques for message management such as lanes, links and message distribution-related functionality.

51 Claims, 6 Drawing Sheets

(51) Int. Cl.
*G06F 21/12* (2013.01)
*G06F 21/31* (2013.01)
*G06F 21/60* (2013.01)
*G06F 21/62* (2013.01)
*H04W 12/02* (2009.01)
*H04L 12/26* (2006.01)
*H04L 12/803* (2013.01)

(56) References Cited

U.S. PATENT DOCUMENTS

| | | | |
|---|---|---|---|
| 8,898,808 B1 | 11/2014 | Kittrell | |
| 9,510,036 B1 | 11/2016 | Lewis | |
| 9,699,133 B2 | 7/2017 | Le Jouan | |
| 9,703,988 B1 | 7/2017 | Sudbury | |
| 9,721,108 B2 | 8/2017 | Krishnaurthy | |
| 2003/0088520 A1 | 5/2003 | Bohrer | |
| 2003/0131052 A1 | 7/2003 | Allan | |
| 2003/0158940 A1 | 8/2003 | Leigh | |
| 2004/0139025 A1 | 7/2004 | Coleman | |
| 2006/0253580 A1 | 11/2006 | Dixon et al. | |
| 2007/0266079 A1 | 11/2007 | Criddle | |
| 2007/0282832 A1 | 12/2007 | Herley | |
| 2008/0016198 A1 | 1/2008 | Johnston-Watt | |
| 2008/0114739 A1 | 5/2008 | Hayes | |
| 2008/0115214 A1 | 5/2008 | Rowley | |
| 2008/0317050 A1 | 12/2008 | Xiong | |
| 2009/0100322 A1 | 4/2009 | Phillips | |
| 2010/0088170 A1 | 4/2010 | Glore, Jr. | |
| 2010/0094860 A1 | 4/2010 | Lin | |
| 2010/0185656 A1 | 7/2010 | Pollard | |
| 2011/0055368 A1* | 3/2011 | Colrain | G06F 9/505 709/223 |
| 2011/0126290 A1 | 5/2011 | Krishnamurthy | |
| 2011/0022681 A1 | 7/2011 | Simeonov | |
| 2011/0173071 A1 | 7/2011 | Meyer | |
| 2011/0295988 A1 | 12/2011 | Le Jouan | |
| 2012/0023133 A1 | 1/2012 | Yeon | |
| 2012/0084349 A1 | 4/2012 | Lee | |
| 2013/0145375 A1* | 6/2013 | Kang | G06F 21/53 718/104 |
| 2013/0151547 A1 | 6/2013 | Queck | |
| 2013/0238742 A1 | 9/2013 | Kay | |
| 2013/0318199 A1 | 11/2013 | Le Jouan | |
| 2014/0032707 A1 | 1/2014 | Doshi | |
| 2014/0195626 A1 | 7/2014 | Ruff | |
| 2014/0324843 A1 | 10/2014 | Rapoport | |
| 2014/0337466 A1 | 11/2014 | Li | |
| 2014/0379428 A1 | 12/2014 | Phansalkar | |
| 2015/0146516 A1 | 5/2015 | Van Zijst | |
| 2015/0178769 A1 | 6/2015 | Mirisola | |
| 2016/0300231 A1 | 10/2016 | Shavell | |
| 2017/0004573 A1 | 1/2017 | Hussain | |
| 2017/0116642 A1 | 4/2017 | Meyer | |
| 2017/0286719 A1 | 10/2017 | Krischnamurthy | |

OTHER PUBLICATIONS

International Search Report from PCT/US16/50204.
European Search Report for Application No. EP16843111.

* cited by examiner

MULTIPLEXED DEMAND SIGNALED DISTRIBUTED MESSAGING

CROSS-REFERENCE TO RELATED APPLICATION(S)

This application claims the benefit of U.S. Provisional Patent Application Ser. No. 62/214,786, filed Sep. 4, 2015, and titled "PRIVACY AWARENESS APPLICATION, LIVE PRIVACY POLICY, AND DISTRIBUTED AND MULTIPLEXED PEER TO PEER REAL-TIME MESSAGING UTILIZING BACK PRESSURE SIGNALLING," which is hereby incorporated by reference in its entirety for all purposes.

FIELD OF THE INVENTION

The present invention relates to the field of real-time messaging. More specifically, the present invention relates to real-time distributed messaging between granular services distributed across a cluster.

BACKGROUND OF THE INVENTION

Business to business and business to consumer software applications are taking advantage of advances in networking technology, handheld devices and availability of enormous amounts of data to offer a rich set of functionality to users. These applications are increasingly becoming dependent on and demanding real-time data to provide differentiated products and services to users. Another key trend in application development is the use of a set of orchestrated services that are able to deliver the required functionality in an environment discussed herein.

SUMMARY OF THE INVENTION

A multiplexed demand signaled distributed messaging system and method enables high capacity real-time messaging with efficient networking and computing resource utilization between application services by generating and utilizing new techniques for message management such as lanes, links and message distribution-related functionality.

DETAILED DESCRIPTION OF THE PREFERRED EMBODIMENT

Services are dependent on a messaging infrastructure that will deliver control and data messages between the services. Important to the orchestration of these services is the underlying messaging infrastructure that is able to solve the following problems:

1. In an environment where many services cooperate to process large amounts of data, the messaging infrastructure may be a bottleneck for delivery of control and data messages due to a large number of services and an extraordinarily large number of messages.

2. Services may run on single server, multiple servers in a cluster or multiple clusters, and therefore the messaging software should work seamlessly across a variety of computing infrastructures.

3. Data and control messages may arrive at different rates from different sources, and the rate may or may not be predictable.

4. A variety of networks (e.g., Zigbee/802.15.4, WiFi, 4G LTE) may be used for the message traffic. This results in unpredictable connectivity, bandwidth availability and message delivery intervals.

5. Message delivery endpoints (e.g., mobile phone) may or may not be able have the ability process messages at a rapid rate.

6. Message size is able to be short or long, and the content may be structured or unstructured.

7. Messages may require transformation (e.g., to a different format, language, structure) to meet requirements of a destination.

8. Messages may require a priority scheme that enables distributions of high priority messages before lower priority messages.

9. Critical messages may require guaranteed delivery by utilizing high availability techniques (e.g., using redundant message delivery options, to protect against a single failure).

10. Typically messaging infrastructure inefficiencies will demand use of additional computing platforms to handle capacity and scalability, memory and network bandwidth.

11. Inability to multiplex messages will result in connectivity explosion and administration difficulties.

12. Software service implementations are complex and runtime execution is slower because infrastructure software capabilities are implemented in the application layer. These include: security, privacy, regulatory functions (e.g., audit), capacity/scalability management, and high availability.

The Multiplexed Demand Signaled Distributed Messaging (MDSDM) system and method is a software services (client service to server side service or between server side services) messaging software that provides distributed and multiplexed demand signaled distributed messaging, utilizing backpressure signaling. This is referred to as MDSDM. Utilizing MDSDM, software services within an application or software services associated with one or more applications are able to communicate in real-time with no understanding of how the messages are transported and delivered under variable message load conditions, bandwidth availability conditions and message processing conditions.

Figure 1:
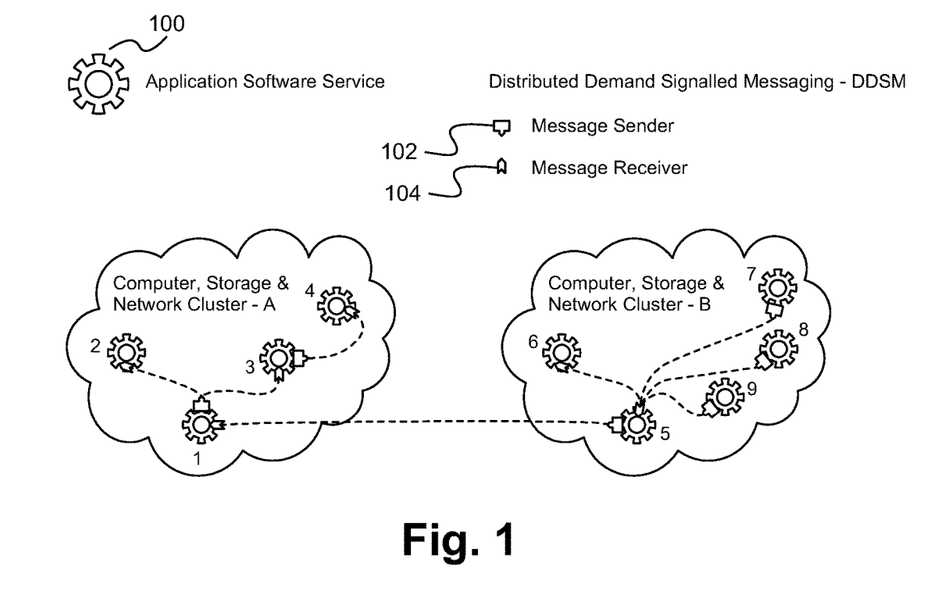
FIG. 1 illustrates a diagram of a multiplexed demand signalled distributed messaging (MDSDM) implementation according to some embodiments.

FIG. 1 illustrates a diagram of an MDSDM implementation according to some embodiments. As shown, there are two computer, storage and network clusters, which are each one or more servers along with the storage and networking equipment used by an application. Cluster A is used by application A, and Cluster B is used by application B. MDSDM software includes a message sending component identified as a message sender 102 and a message receiving component identified as message receiver 104. Application software services 100 are components of a software application where each of the services provides one or more functions. Services 1, 2, 3 and 4 are associated with Application A, and services 5, 6, 7, 8, and 9 are associated with Application B. Services identified as 1, 3 and 5 are both receivers and senders of messages. Services identified as 2 and 4 are message receivers only. Services identified as 6, 7, 8, and 9 are message senders only.

FIG. 1 shows the following high level capabilities:
1. MDSDM is a distributed functionality with no gateway or centralized message distributed broker functionality. Each software service has MDSDM sending and receiving components.
2. The following application deployment scenarios are supported: intra-server, inter-server, intra-cluster and inter-cluster.
3. MDSDM is able to be used for both intra-application and inter-application communication.
4. MDSDM provides messages distribution as illustrated by service 5 distributing messages received from services 6, 7, 8 and 9 to services 2 and 3 via service 1.
5. Services are able to be senders of messages, receivers of messages, senders and receivers of messages, and message processing functions.

MDSDM is a distributed and multiplexed peer-to-peer real-time messaging, utilizing demand signaling between the message senders or publishers and message receivers or subscribers. Unlike a typical publish and subscribe messaging software, MDSDM addresses a number of application messaging issues associated with:
1. Realtime distribution of messages. There is no store and forward functionality. Messages are pushed to the subscribers/receivers and then persisted in the background, if required.
2. Understanding message bottlenecks due to network connectivity and bandwidth and processing capabilities of certain services. The publishing functionality of a service takes into consideration the availability of network and the ability of the subscriber to receive the message.
3. Efficient multiplexed messaging with minimal overhead.
4. Adding new messaging features that are typically replicated in each software services such as support for high-availability. The high-availability implementation is done outside the application service, and therefore the performance of the application service is not impacted. The message replication for high-availability is implemented in the load balancing function.
5. Network back pressure demand signaling. Network bandwidth and buffers are monitored to determine the subscriber's ability to consume message traffic.
6. Flexible addressing mechanism. Unlike other messaging software, software services are able to utilize Uniform Resource Indicator (URI)-based addressing to subscribe to or publish messages.
7. No Message distribution choke points. Other message software typically utilizes a message distribution hub, but MDSDM is a peer-to-peer messaging infrastructure.
8. Message distribution across clusters. Location of service end-points is transparent to the MDSDM; messages are delivered seamlessly across clusters.
9. Message privacy and security capabilities. MDSDM allows privacy and security related filters to be specified in order to implement data attribute level and message end point level security implementation. Data privacy is implemented using data masking for attributes in messages.
10. Message transformations which are controlled from a receiver perspective.

The MDSDM method and system dramatically improves performance and scalability of publish/subscribe messaging software to support interactive real-time application.

MDSDM Terminology Definitions

The following are definitions of the terminology used to describe the MDSDM details:

Service Pool: A pool of software services associated with applications that utilize MDSDM to communicate messages between them and are resident on a single network endpoint (e.g., pool.example.com).

Service: A software service associated with an application that is part of a service pool. Each service uses MDSDM to send and receive messages. A service is addressed using the associated service pool domain (e.g., pool.example.com/service1). The template for the service is provided by the MDSDM. Application developers implement the application specific code in the template.

Network Connection: A standard network connection (e.g., TCP/IP, WebSocket) between two processes on two devices (e.g., servers) in a single cluster or across clusters.

Lane Manager: A logical connection manager, associated with a service pool, that generates and manages network connections between endpoints, and generates streams to distribute messages to all services in the service pool which originate from a specific service and lane for which a stream is generated.

Stream: A logical connection established over a network connection by the lane manager between itself and a corresponding service and specific lane supported by that service. Streams share an existing network connection if the stream is between the same service pool. A stream supports both unicast and multicast messaging.

Link: A logical connection established over a stream that is an expression of interest for messages from a specific service and a lane associated with that service. Links share an existing stream, becoming effectively multicast, if the link is to the same service and a lane associated with the service.

Lane: A lane is a logical messaging endpoint associated with service. There are able to be zero or more lanes associated with a service. A lane is addressed using the associated service address and a lane identifier (e.g., [pool.example.com/service1, a/lane1]). The lane identifier includes a structured prefix, followed by a lane name.

Back Pressure: This involves detection of inability of a subscribing service to receive and/or process messages for which it has expressed an interest in. The lane publishing software detects a signal that the receiver/subscriber is not available to accept messages. This state of not being able to accept messages is referred to as back pressure.

The MDSDM functionality is based on a publish/subscribe paradigm but the following capabilities will reduce application services complexity while enhancing efficiency, performance, scalability and availability:

Message multiplexing functionality: Multiplexing refers to functionality where a connection is shared to send and receive messages rather than generate a new connection for each logical messaging endpoint.

Figure 2:
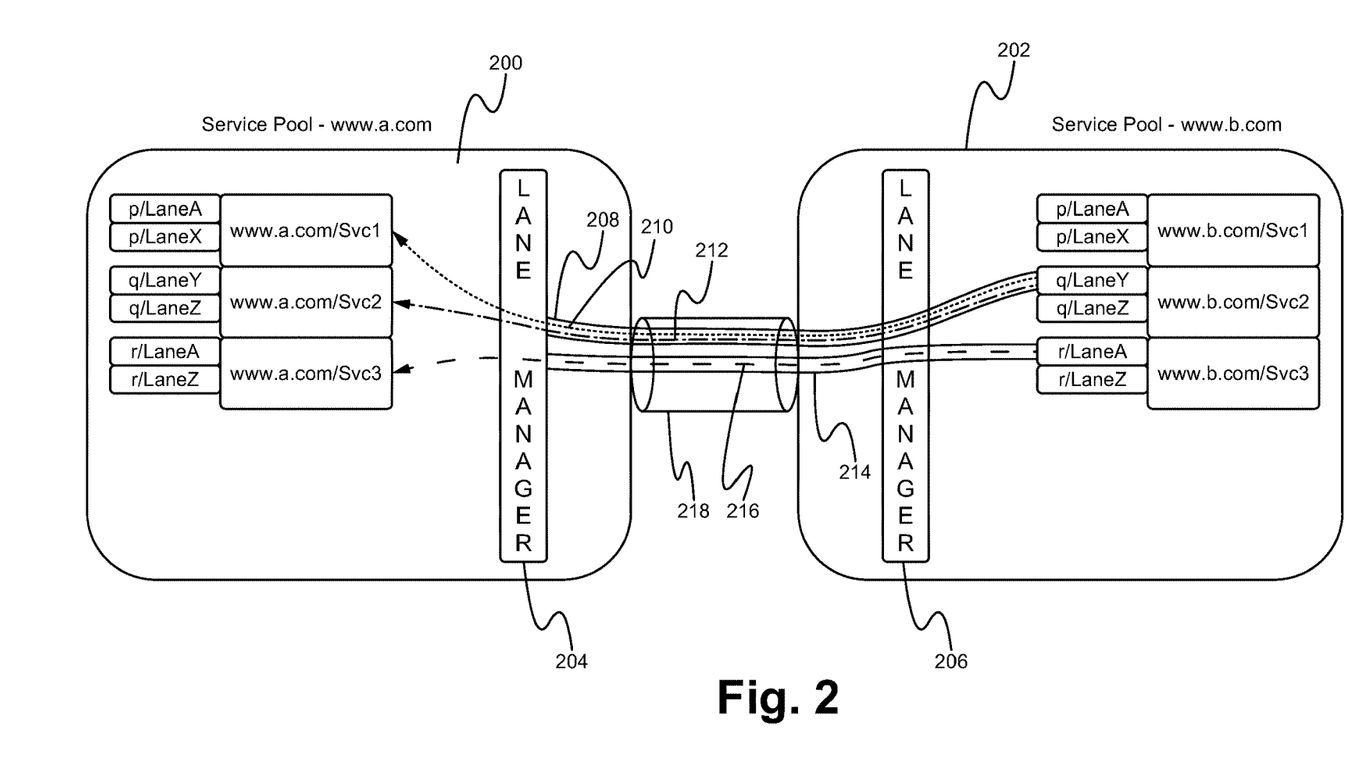
FIG. 2 illustrates a diagram of MDSDM multiplexing and local message broadcasting according to some embodiments.

FIG. 2 illustrates a diagram of MDSDM multiplexing according to some embodiments.

Standard or Application Components

A service pool is a group of application related services are managed within a service pool. Two service pools are shown, www.a.com 200 and www.b.com 202. A service provides a set of functions for an application. The services shown are: www.a.com/Svc1, www.a.com/Svc2 and www.a.com/Svc3 associated with service pool www.a.com 200; www.b.com/Svc1, www.b.com/Svc2 and www.b.com/Svc3 associated with service pool www.b.com 202. A network connection 218 is a connection between two service pools (e.g., WebSocket over TCP). A network connection 218 is shown between www.a.com 200 and www.b.com 202.

MDSDM Components

A lane is a message queue associated with a service. A service can support many lanes. FIG. 2 shows the following Lanes:

p/LaneA and p/LaneX associated with services www.a.com/Svc1 and www.b.com/Svc1 q/LaneY and q/LaneZ associated with services www.a.com/Svc2 and www.b.com/Svc2 r/LaneA and r/LaneZ associated with services www.a.com/Svc3 and www.b.com/Svc3

A lane as shown above has a structured prefix and a lane name to identify a lane. The prefix is forward slash (e.g., "/") separating identifiers. In the above example, there is only an identifier associated with each lane (e.g., p or q or r). Elements of the structured prefix are used for a message scope feature that allows access to multiple queues.

A lane manager manages the network connections, streams and links associated with service pool. FIG. 2 shows:

Lane Manager 204 for Service Pool www.a.com
Lane Manager 206 for Service Pool www.b.com A stream is a logical connection between a lane manager and a lane associated with a service. FIG. 2 shows two streams:

Stream 208 from Lane Manager www.a.com and q/LaneY, Service www.b.com/Svc2

Stream 214 from Lane Manager www.a.com and r/LaneA, Service www.b.com/Svc3

A link is a logical connection between a service and a lane associated with another service that expresses interest for messages in that lane. Links are able to be "synced" links or "standard" links. "Synced" links allow a subscriber to receive messages from the publisher that existed prior to generation of the link (e.g., messages that are already in the queue). "Standard" links allow a subscriber to receive only new messages from the publisher that have been generated after the generation of the link. FIG. 2 shows three links Link 210 between Service www.a.com/Svc1 and q/LaneY, wwww.b.com/Svc2

Link 212 between Service www.a.com/Svc2 and q/LaneY, www.b.com/Svc2

Link 214 between Service www.a.com/Svc3 and r/LaneA, www.b.com/Svc3

The multiplexing functionality is managed by the lane manager component described above. The multiplexing scenarios are:

A. www.a.com/Svc1 service requests a Link to www.b.com/Svc2, q/LaneY. The Lane 204 Manager on www.a.com 200 detects that there is no network connection to www.b.com 202 and establishes for example a TCP connection to the Lane Manager 206 on www.b.com. This is labeled as network connection 218 (e.g., WebSocket TCP connection). Next, lane manager on www.a.com establishes a stream to www.b.com/Svc2 q/LaneY, labeled as Stream 208 from www.b.com/Svc2, q/LaneY to Lane Manager www.a.com and shown as thick shaded line. Finally, a logical connection shown by dotted line and labeled Link 210 from www.a.com/Svc1 to www.b.com/Svc2, q/LaneY is established.

B. www.a.com/Svc2 service requests a Link to www.b.com/Svc2, q/LaneY. The Lane Manager 204 on www.a.com 200 detects the existing Network Connection 218 to www.b.com 202 and existing Stream 208 to www.b.com/Svc2, q/LaneY and therefore generates a logical connection shown as a dotted and dashed line from www.a.com/Svc2 to www.b.com/Svc2, q/LaneY. The link 212 is therefore multiplexed on the same stream between Lane Manager www.a.com and www.b.com/Svc2, q/LaneY.

C. www.a.com/Svc3 service requests a Link 216 to www.b.com/Svc3, r/LaneA. The Lane Manager 204 on www.a.com 200 detects an existing Network Connection 218 to www.b.com 202. Lane Manager 204 on www.a.com 200 does not find a Stream to www.b.com/Svc3, r/LaneA so it establishes a lane labeled Stream 214 from www.b.com/Svc3, r/LaneA to Lane Manager www.a.com. Finally, a link 216 shown as a dashed line is established between www.a.com/Svc3 and www.b.com/Svc3, r/LaneA.

D. Multiplexing scenarios shown are hierarchical. Streams are multiplexed on a network connection, and links are multiplexed on a stream.

Back pressure is a scenario where messages from a lane cannot be delivered as established by the link due to connection problems or processing problems. The lane software waits for a signal before sending the message and therefore is able to handle scenarios of network connection delays or processing delays.

Figure 3:
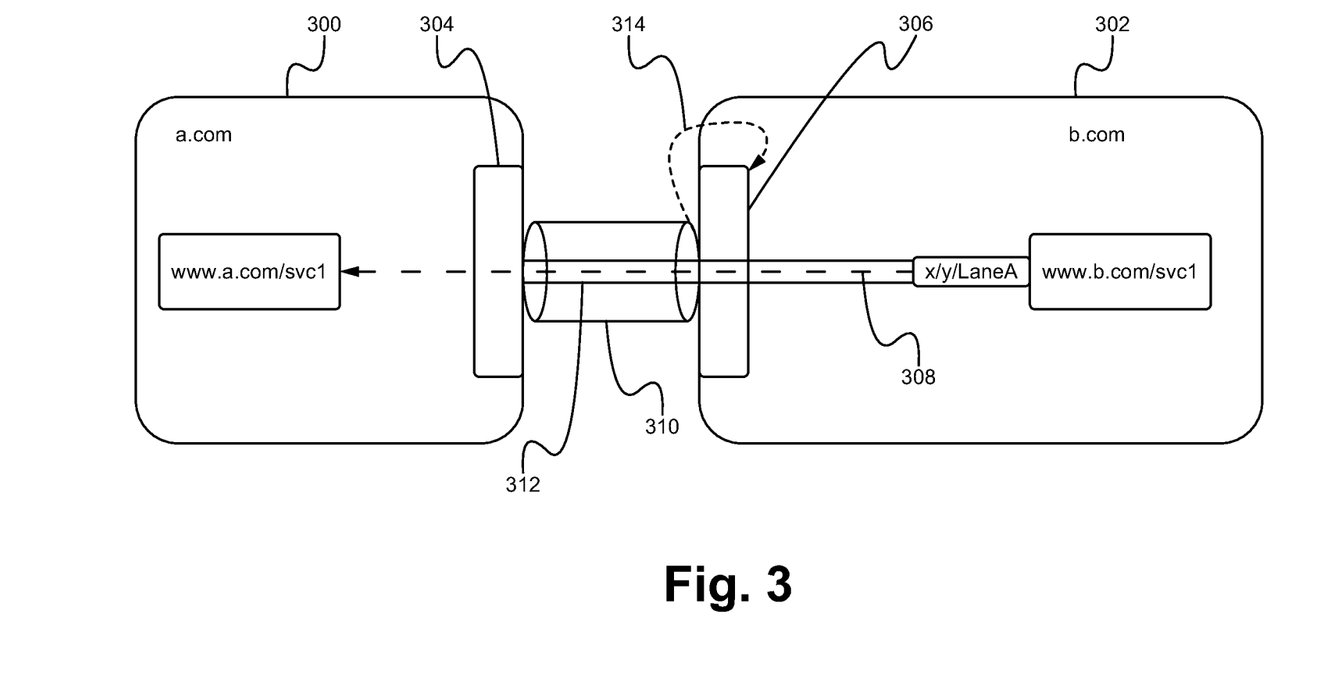
FIG. 3 illustrates a diagram of handling back pressure according to some embodiments.

FIG. 3 illustrates a diagram of handling back pressure according to some embodiments. Lane Manager www.b.com 306 for service pool 302, for a back pressure managed lane, will look for an availability signal, labeled signal 314 before attempting to write messages from www.b.com/svc1 x/y/LaneA using the link 308 using the stream 312 over the network connection 310 to lane manager www.a.com 304 for service pool 300. So a connection availability or available for processing signal is used to handle connection problems or processing problems, and until then, the messages in x/y/LaneA are not processed, and if appropriate will not be generated, for forwarding.

Application services are able to take advantage of numerous MDSDM lane features. There are many different lane types:

Ephemeral is a lane type for high speed delivery of messages. Two options are supported for Ephemeral message lanes: A cached lane is where messages are maintained in memory and therefore limited by the amount and availability of memory. A lazy lane is where messages are built on demand. Therefore the delivery is throttled. Messages are therefore generated at the last minute before consumption.

A persistent lane is for reliable and backed up delivery of messages. A file lane is used for a regular file for message persistence. A database lane is used for a database for message persistence. A history lane uses a combination of online and offline storage.

A lane sync feature allows services to get existing messages and the new messages as they are generated. A keyed storage of messages in a lane table results in always up-to-date messages. A message access control allows the lane to filter messages sent to the link requester based on the credentials presented. A message transformation enables lanes to transform messages based on the service that requested a link using requesting service provided transformation engine. A message privacy monitoring allows data filtering and data masking using a transformation engine. A message priority enables processing and forwarding of high priority messages before others. Runtime configuration of lane features allows application services to update the message lane requirements without a software upgrade. The new features will be applicable to new messages only.

MDSDM uses Uniform Resource Identifier (URI) to identify message endpoints. The URI is already used for web interactions over the Internet and demonstrates the addressing scalability. The same addressing technique is applied to identify message queues to interact between the sender and receiver. As a result of using the URIs to address message queues:

Software services are able to be installed and run from any hardware platform as long as there is network connectivity;

Services and queues are able to be moved from a one hardware platform to another without impacting the consumers of message;

Conflicting message endpoint naming is able to be avoided;

Queue addressing scales like the web addressing, and there are no limitations on the numbers of queues that are able to be generated and addressed; and Message scoping features are able to utilize the URI address hierarchy.

MDSDM enables highly scalable and efficient propagation of messages.

Figure 4:
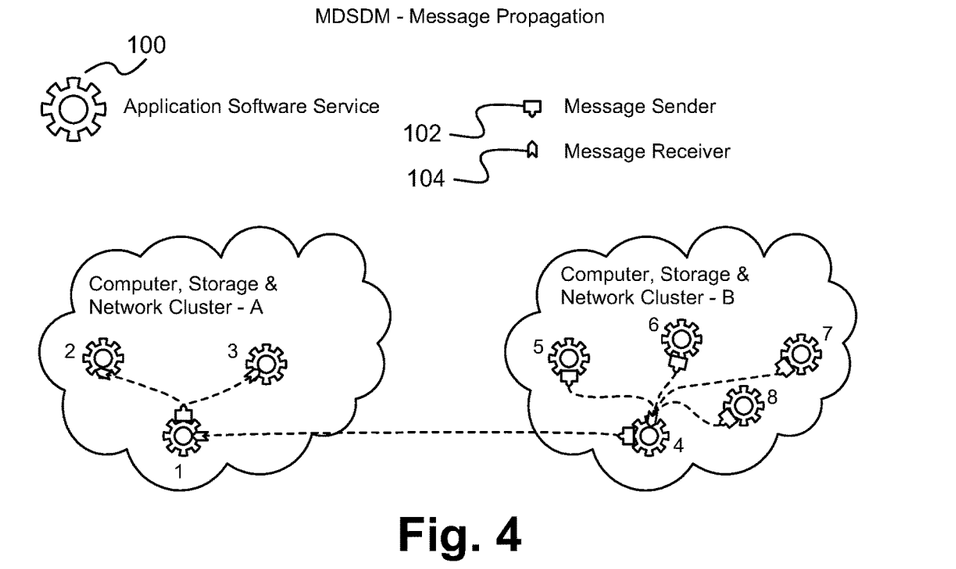
FIG. 4 illustrates a diagram of MDSDM supporting message propagation according to some embodiments.

FIG. 4 illustrates a diagram of MDSDM supporting message propagation according to some embodiments. A message propagation scenario shown involves services 5, 6, 7 and 8 running on cluster B would like to deliver messages to services 2 and 3 running on cluster A. The MDSDM message propagation feature allows services 5, 6, 7, 8 to send message to a local cluster B service 4. Service 4 then propagates the messages to service 1 on cluster A, which in turn propagates messages to services 2 and 3. This results in significant reduction of message traffic, both local and network traffic.

Figure 5:
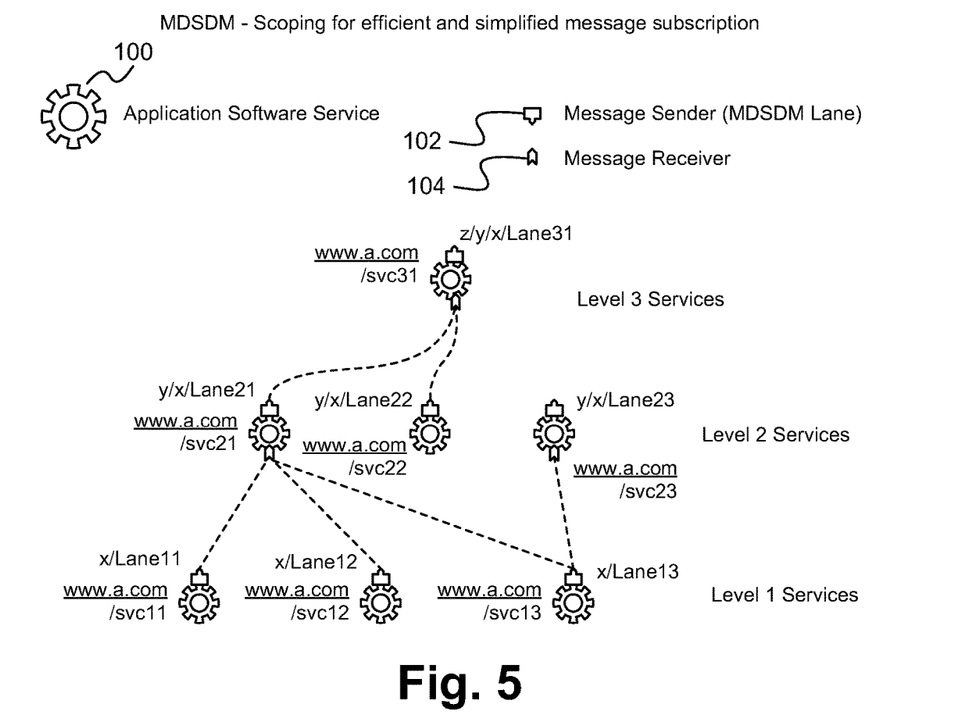
FIG. 5 illustrates a diagram of message scoping according to some embodiments.

FIG. 5 illustrates a diagram of message scoping according to some embodiments. The message scoping feature of MDSDM allows services to receive messages from any level in a hierarchy.

Services (e.g., www.a.com/svc21) generating a link to www.a.com/svc11, x/Lane11 lane will receive messages from www.a.com/svc1, x/Lane11 only.

Services (e.g., www.a.com/svc31) generating a link to www.a.com/svc21, y/x/Lane21 lane will receive messages from: www.a.com/svc11, x/Lane11, www.a.com/svc12, x/Lane12, www.a.com/svc13, x/Lane13, and www.a.com/svc21, y/x/Lane21.

Even if there is no explicit message forwarding using links between www.a.com/svc21 and services at Level 1 (www.a.com/svc11, www.a.com/svc12 and www.a.com/svc13), services are able to request messages using the lane prefix. For this scoping to work, the lane identifiers (prefix and lane name) are unique across the services.

In the above example, services are able to generate a link to "scoped lane", "x" and therefore get messages from www.a.com/svc11, x/Lane11; www.a.com/svc12, x/Lane12; www.a.com/svc13, x/Lane13

Similarly, services are able to generate a link to "scoped lane", y and therefore get messages from www.a.com/svc11, x/Lane11; www.a.com/svc12, x/Lane12; www.a.com/svc13, x/Lane13; www.a.com/svc21, y/x/Lane21. In this case, scope lane prefix, "y", hierarchically includes all lane prefixes below it in the hierarchy (i.e., "x" prefix lanes).

Alternatively, services are able to generate a link to a "Service", www.b.com/svc13 without specifying the lanes and there by implicitly link to all lanes for the service, www.b.com/svc13.

MDSDM links allow services to express interest in a lane for access to the messages that are sent on that lane from an associated service. Links are logical connections that are established to communicate over streams and ultimately over a network connection. MDSDM allows:

Dynamic establishment of links. Services are able to link and unlink in real-time which offers flexibility based on user needs or business process needs.

Links remain active even when the network connections have communication failures. The MDSDM infrastructure software will automatically retry the underlying connections and reestablish the connection. During this interval the messages are queued. Once the underlying connection is established then the messages are delivered to the services. Back pressure handling ensures that, whenever possible, new messages are not generated when the connection over which they are to be sent is unavailable.

Multiple links are able to share a stream between the lane manager and the lane associated with a service.

Filters are able to be specified for the links by application developers for: data transformation, data privacy related masking, and data security related encryption.

MDSDM software provides introspection functionality that involves self monitoring. MDSDM introspection software in real-time monitors and takes required actions, that are configurable, to provide the following data: contents of lane; configured parameters of lane, link, lane manager, stream, and network connection; performance parameters; capacity parameters; and availability parameters.

The following performance parameters are monitored and made available via special lanes to services and an administrative user interface: time to generate and delete lanes and links; time to deliver a first message for each lane; message processing rates (minimum, maximum and average) of a lane, all lanes for a service, all services of an application; message delivery interval (minimum, maximum and average) of each lane, across all lanes for a service, across all services of an application; error rates and idle durations for: each lane, all lanes for a service, all services of an application, stream and network connection; status (working, idle, waiting, not-responsive, queue-full) for: each lane, all lanes for a service (status counts), all services of an application (status counts), stream, and network connection.

The following capacity parameters are monitored and made available via special lanes to services and administrative user interface: number of lanes per service, stored data per lane, stored data per service, stored data per application, number of links for each service, number of links for the application, message size (minimum, maximum, average) per lane, for all lanes for a service, or for all services for an application.

The following availability parameters are monitored and made available to services and an administrative user interface: uptime for each: lane, link, stream, and network connection; failover status of high-availability lanes; number of failovers and the associated conditions; duration on primary lane; and duration on backup lane.

Figure 6:
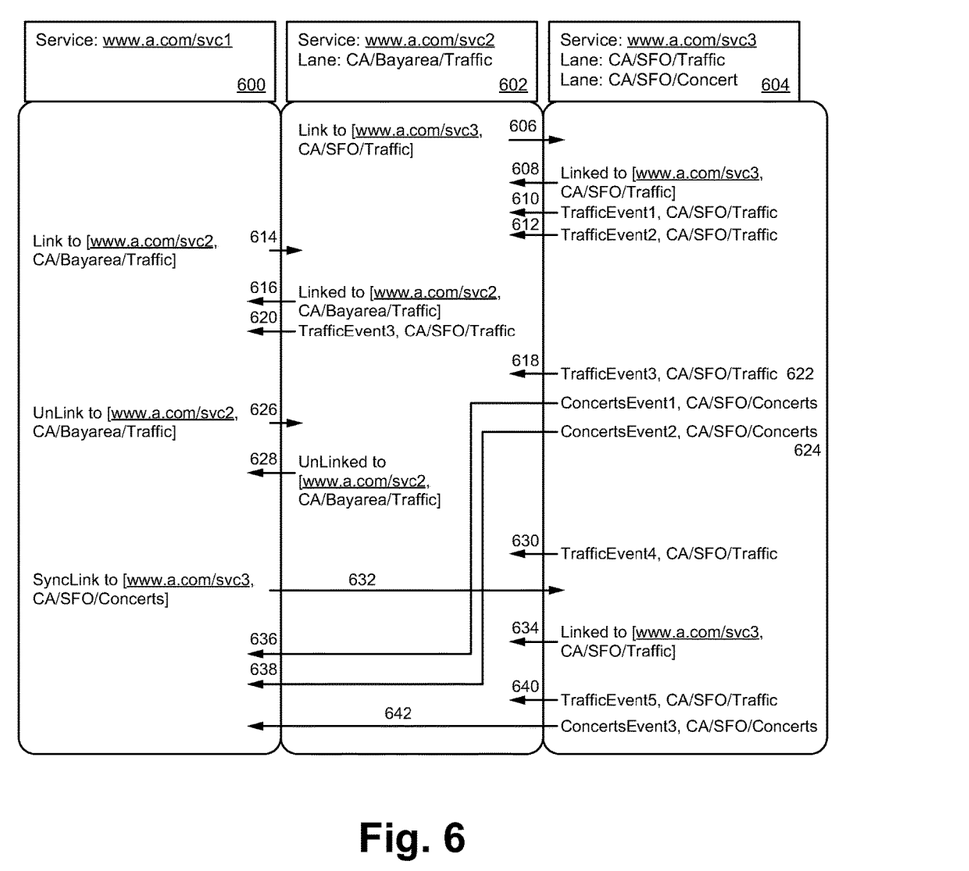
FIG. 6 illustrates a diagram of the MDSDM software in operation according to some embodiments.

FIG. 6 illustrates a diagram of the MDSDM software in operation according to some embodiments. Software services that use message multiplexing, distributed messaging and demand signal based real-time messaging will utilize the MDSDM software. Software service www.a.com/svc1 600 is the consumer of messages. Software service www.a.com/svc2 602 is the consumer and publisher of messages. The publishing is from lane CA/Bayarea/Traffic. Software service www.a.com/svc3 604 is a publisher of messages. The publishing of messages is from lane CA/SFO/Traffic and CA/SFO/Concerts. The following steps illustrate how the MDSDM software works:

Application software services www.a.com/svc1 600, www.a.com/svc2 602 and www.a.com/svc3 604 utilize the MDSDM SDK to access the functionality. MDSDM SDK is the software development kit that allows software services to implement the messaging functionality between the services.

Service www.a.com/svc1 600 as a consumer of messages utilizes the "link" generation functions from the MDSDM SDK.

Service www.a.com/svc2 602 as a publisher of messages utilizes the "lane" generation functions, and as a subscriber uses the "link" generation functions from the MDSDM SDK. The www.a.com/svc2 602 generates a lane CA/Bayarea/Traffic.

Service www.a.com/svc3 604 as a publisher of messages utilizes the "lane" generation functions of the MDSDM SDK. The www.a.com/svc3 generates CA/SFO/Traffic lane and CA/SFO/Concerts lane.

Service www.a.com/svc2 602 wants traffic related messages from service www.a.com/svc3. So the software utilizes the "link" generation function from MDSDM to generate a link to the www.a.com/svc3, CA/SFO/Traffic lane. MDSDM software at runtime generates the underlying network connections, the stream between the www.a.com lane manager and the lane www.a.com/svc3, CA/SFO/Traffic.

MDSDM software that manages the lanes www.a.com/svc2, CA/Bayarea/Traffic; www.a.com/svc3, CA/SFO/Traffic and www.a.com/svc3, CA/SFO/Concerts will route messages to the appropriate destinations based on the links generated by the services.

The following steps illustrate the overall functioning of the MDSDM.

Service www.a.com/svc2 generates a "Standard" link 606 (note: as described previously for a standard link only new messages are sent) to www.a.com/svc3, CA/SFO/Traffic using the link generation MDSDM software.

MDSDM software associated with www.a.com/svc3 sends "Linked" response 608. Service www.a.com/svc3 wants to publish an event TrafficEvent1 to the lane CA/SFO/Traffic, so it calls the lane publish software of MDSDM. MDSDM lane software records the TrafficEvent1 610 and looks for links to identify subscribers. Service www.a.com/svc2 is identified as a subscriber, and therefore the message is delivered to www.a.com/svc2.

Service www.a.com/svc3 wants to publish an event TrafficEvent2 612 to the lane CA/SFO/Traffic, so it calls the MDSDM lane publish software. MDSDM lane software records the TrafficEvent2 and forwards the message to subscribers based on the links established. The message is delivered to www.a.com/svc2.

Service www.a.com/svc1 generates a "Standard" link 614 to www.a.com/svc2 CA/Bayarea/Traffic using the link generation MDSDM software.

MDSDM software of service www.a.com/svc2 sends "Linked" response 616 as acknowlegement for the link request.

Service www.a.com/svc3 wants to publish an event TrafficEvent3 618 to the lane CA/SFO/Traffic, so it calls the MDSDM lane publish software. MDSDM lane software records the TrafficEvent3 and forwards the message to subscribers based on the links established. The message is delivered to www.a.com/svc2. Service www.a.com/svc2 takes this message and requests MDSDM to publish the message on lane CA/Bayarea/Traffic. MDSDM lane software records the TrafficEvent3 620 and forwards the message to subscribers based on the links established. The message is delivered to www.a.com/svc1.

Service www.a.com/svc3 wants to publish an event ConcertsEvent1 622 to the lane CA/SFO/Concerts, so it calls the MDSDM lane publish software. MDSDM lane software records the ConcertsEvent1 and does not forward the message because there are no active links.

Service www.a.com/svc3 wants to publish an event ConcertsEvent2 624 to the lane CA/SFO/Concerts, so it calls the MDSDM lane publish software. MDSDM lane software records the ConcertsEvent2 and does not forward the message because there are no active links.

Service www.a.com/svc1 no longer wants the message from www.a.com/svc2, lane CA/Bayarea/Traffic so it uses MDSDM function to "Unlink" 626.

The unlink response 628 from MDSDM link management software is sent.

Service www.a.com/svc3 wants to publish an event TrafficEvent3 630 to the lane CA/SFO/Traffic, so it calls the MDSDM lane publish software. MDSDM lane software records the TrafficEvent3 and forwards the message to subscribers based on the links established. The message is delivered to www.a.com/svc2.

Service www.a.com/svc1 generates a "Synced" link 632 (note: synced links indicate that MDSDM should forward existing lane messages) to www.a.com/svc3 CA/Bayarea/Concerts using the link generation MDSDM software.

MDSDM lane management software detects the request for "Synced" link 634 for www.a.com/svc3, CA/SFO/Concerts lane and then locates existing messages ConcertEvent1 636 and ConcertEvent2 638 and forwards these messages to www.a.com/svc1. So www.a.com/svc1 was able to receive preexisting messages from the lane. This demonstrates how messages are persistent and how services are able to receive existing messages in the lanes.

Service www.a.com/svc3 wants to publish an event TrafficEvent5 640 to the lane CA/SFO/Traffic, so it calls the MDSDM lane publish software. MDSDM lane software records the TrafficEvent5 and forwards the message to subscribers based on the links established. The message is delivered to www.a.com/svc2.

Service www.a.com/svc3 wants to publish an event ConcertsEvent3 642 to the lane CA/SFO/Concerts, so it calls the MDSDM lane publish software. MDSDM lane software records the ConcertsEvent2 and forwards this message to www.a.com/svc1. The steps in FIG. 6 are exemplary steps and are not meant to limit the invention in any way.

Applications use MDSDM software for reliable, high capacity real-time messaging between application services. Application services use MDSDM software by using the MDSDM SDK during the software development of services. At runtime, the MDSDM will make the lanes, links and message distribution related functionality. There are three messaging related scenarios associated with MDSDM:

1. Application services publishing messages. These services generate message lanes for publishing messages. Messages are not published to the lanes if there are no active subscribers. This is referred to as lazy generation, and this feature helps with handling of lane capacity. MDSDM SDK provides the software functions for the lane generation and deletion.

2. Application services consuming messages. These services generate links to message lanes from which they want message subscription. These links are able to be "standard" links or "Synced" links. In case of a "Synced" link, MDSDM will deliver all messages in the lane, even messages that were in the lane prior to generation of the link. So this is a feature of the MDSDM for synchronizing with pre-existing messages. MDSDM SDK provides the software functions for the link generation and deletion.

3. Application services publishing and consuming messages. The services generate lanes to publish messages and generate links to subscribe to messages.

Figure 7:
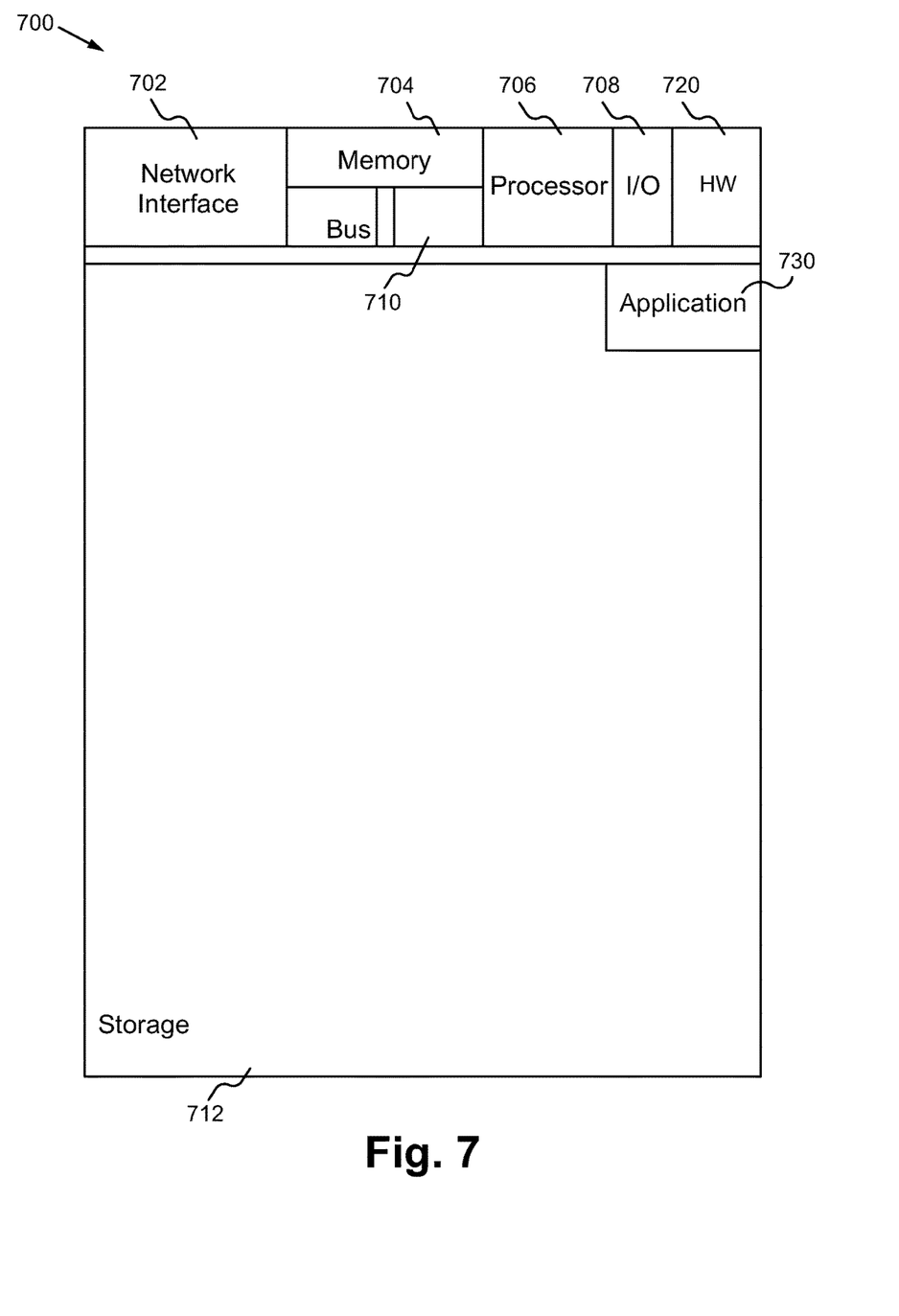
FIG. 7 illustrates a block diagram of an exemplary computing device configured to implement the MDSDM method according to some embodiments.

FIG. 7 illustrates a block diagram of an exemplary computing device configured to implement the MDSDM method according to some embodiments. The computing device 700 is able to be used to acquire, store, compute, process, communicate and/or display information. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. MDSDM application(s) 730 used to perform the MDSDM method are likely to be stored in the storage device 712 and memory 704 and processed as applications are typically processed. More or fewer components shown in FIG. 7 are able to be included in the computing device 700. In some embodiments, MDSDM hardware 720 is included. Although the computing device 700 in FIG. 7 includes applications 730 and hardware 720 for the MDSDM method, the MDSDM method is able to be implemented on a computing device in hardware, firmware, software or any combination thereof. For example, in some embodiments, the MDSDM method applications 730 are programmed in a memory and executed using a processor. In another example, in some embodiments, the MDSDM hardware 720 is programmed hardware logic including gates specifically designed to implement the MDSDM method.

In some embodiments, the MDSDM application(s) 730 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, an augmented reality device, a virtual reality device, a home entertainment system, smart jewelry (e.g., smart watch) or any other suitable computing device.

To utilize the MDSDM method and system, links, lanes and network connections are used to send messages between applications.

In operation, the MDSDM method and system provides:
1. Message multiplexing. This feature of MDSDM has the following benefits:
a. Service to Service connections do not result in a physical connection. So where there are large number of services communicating with each other as in the case of a graph of services, there is no explosion of connections.
b. Physical connectivity (WebSocket) and the Stream connection is hidden from the services requesting links. Receivers and senders of messages have lower complexity because they do not have to manage connection failure of websocket and streams.
c. Lane Manager locally distributes message to all the services that have requested links to the same Lane. This results in fewer messages between service pools, faster message delivery and lower communications bandwidth costs.
2. Back pressure management. This feature allows a Lane to hold messages until a signal that the connection is up, and the Service is ready to receive messages. Therefore, there is no loss of messages due to message overflow or any other condition regarding network connectivity.
3. Lane management. This feature provides simplified communication between services. The MDSDM software without the knowledge of application services handles issues.
4. Addressing the message endpoints. The URI based addressing scheme provide application services a simple and universal handle for communication without the knowledge of where the service is supported. This is a known addressing scheme used by the Web and therefore very flexible and are able to scale easily to accommodate numerous services and message endpoints.
5. Message propagation: The message propagation functionality will reduce the number of connections and improve message throughput of applications. This also enables real-time delivery of messages.
6. Message scoping: This feature allows applications to be lane efficient and link efficient and therefore contributes to message throughput and real-time delivery of messages.
7. Link management: This enables real-time orchestration of message flow within an application and enables application services to be independent of the underlying message transportation related connections.
8. Messaging introspection: The message introspection allows applications to monitor the performance, capacity and availability of the messaging infrastructure and take appropriate actions (to handle performance and capacity issues) such as: start or stop new services, generate or delete new lanes, generate or delete links, and move services to different servers or clusters. The introspection functionality allows applications to orchestrate the functioning of application in real-time.

The MDSDM method and system also provides:
1. Optimal usage of computing resources such as CPU, memory and network on a single server, multiple servers in a cluster and servers on multiple clusters that are geographically distributed.
2. Decoupling of applications from features such as privacy, security, capacity and high availability management.
3. Ability to develop interactive applications that utilize real-time data to implement actions in real-time
4. Support for development of applications that integrate functionality both vertically (e.g., messaging, processing, storage) and horizontally (e.g., client side and server side).
5. Highly efficient and real-time distribution of messages within a server, intracluster and intercluster.
6. Enables implementation of highly scalable applications utilizing optimal incremental hardware infrastructure growth.
7. Enables implementation of applications which must handle messages transmitted over networks with unpredictable connectivity and bandwidth.
8. Enables implementation of applications that are able to process an extraordinarily large amount of data.

9. Use of an universal addressing scheme allows the solution to scale without restrictions.

10. Use of scoping and multiplexing allows most efficient access to message streams with very little overhead.

11. A built in capability to inject transformations into messaging infrastructure enables message consumers to operate without knowledge of message provider and message structure details.

12. Message introspection allows self monitoring of operational, performance and administrative status of the services and messaging infrastructure and therefore are able to be tuned dynamically to adjust to the demands presented.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    a. establishing one or more network connections for peer-to-peer real-time message distribution; and
    b. routing one or more messages to an appropriate destination using the one or more network connections utilizing load balancing and routing functions, wherein when the one or more messages go to multiple subscribers on a single host, the one or more messages from a publisher are only sent once over the one or more network connections, and the one or more messages are broadcast locally without explicit involvement of a publisher and a subscriber to each subscriber of the multiple subscribers on the single host, wherein routing utilizes one or more links and one or more lanes, wherein at least one of the links is a synced link which enables the subscriber to receive the one or more messages from the publisher that existed prior to generation of the link.

2. The method of claim 1, wherein the peer-to-peer message distribution is implemented without a centralized hub/gateway/device between the publisher and the subscriber.

3. The method of claim 1, wherein an existing network connection of the one or more network connections is reused between the publisher and the subscriber transparently without involvement of application services.

4. The method of claim 1, wherein the appropriate destination is determined using universal addressing of messaging end-points.

5. The method of claim 4, wherein the universal addressing of messaging endpoints utilizes a format of a universal resource locator and a service reference.

6. The method of claim 1, further comprising self-monitoring of messaging software and regulation of the messaging software based on the self-monitoring.

7. The method of claim 6, wherein self-monitoring includes computing analysis including analyzing how long processing of a task takes and networking analysis including transfer rates.

8. The method of claim 1, further comprising managing back pressure by detecting subscriber message consumption, analyzing network bandwidth and analyzing network issues, and throttling message publishing based on the detecting and analyzing.

9. The method of claim 8, wherein throttling message publishing includes not publishing messages if a blockage of messages is detected.

10. The method of claim 9, wherein when a blockage of messages is detected, only a most recent message of the one or more messages is published.

11. The method of claim 1, further comprising utilizing one or more custom filters for message transformation, filtering, security, and/or privacy.

12. The method of claim 1, further comprising subscribing to a hierarchy of services to receive messages from a plurality of services without a subscriber explicitly identifying each messaging end-point in the hierarchy.

13. The method of claim 1, further comprising publishing a message of the one or more messages, recording the message and searching links to identify the subscribers, and delivering the message based on the identified subscribers.

14. The method of claim 1, wherein a message of the one or more messages is not forwarded when there are no active links.

15. The method of claim 1, further comprising unlinking a link of the one or more links when a service does not want a message of the one or more messages.

16. The method of claim 1, further comprising receiving a preexisting message from a lane of one or more lanes by establishing a link in the lane after the preexisting message has been generated.

17. The method of claim 1, wherein routing the one or more messages occurs in real-time.

18. An apparatus comprising:
    a. a non-transitory memory for storing a service, the service configured for:
        i. establishing one or more network connections for peer-to-peer real-time message distribution; and
        ii. routing one or more messages to an appropriate destination using the one or more network connections utilizing load balancing and routing functions, wherein when the one or more messages go to multiple subscribers on a single host, the one or more messages from a publisher are only sent once over the one or more network connections, and the one or more messages are broadcast locally without explicit involvement of a publisher and a subscriber to each subscriber of the multiple subscribers on the single host, wherein routing utilizes one or more links and one or more lanes, wherein at least one of the links is a synced link which enables the subscriber to receive the one or more messages from the publisher that existed prior to generation of the link; and
    b. a processor for processing the service.

19. The apparatus of claim 18, wherein the peer-to-peer message distribution is implemented without a centralized hub/gateway/device between the publisher and the subscriber.

20. The apparatus of claim 18, wherein an existing network connection of the one or more network connections is reused between the publisher and the subscriber transparently without involvement of application services.

21. The apparatus of claim 18, wherein the appropriate destination is determined using universal addressing of messaging end-points.

22. The apparatus of claim 21, wherein the universal addressing of messaging endpoints utilizes a format of a universal resource locator and a service reference.

23. The apparatus of claim 18, wherein the apparatus implements self-monitoring of messaging software and regulation based on the self-monitoring.

24. The apparatus of claim 23, wherein self-monitoring includes computing analysis including analyzing how long processing of a task takes and networking analysis including transfer rates.

25. The apparatus of claim 18, wherein the apparatus manages back pressure by detecting subscriber message consumption, analyzing network bandwidth and analyzing network issues, and throttling message publishing based on the detecting and analyzing.

26. The apparatus of claim 25, wherein throttling message publishing includes not publishing messages if a blockage of messages is detected.

27. The apparatus of claim 26, wherein when a blockage of messages is detected, only a most recent message of the one or more messages is published.

28. The apparatus of claim 18, wherein the apparatus utilizes one or more custom filters for message transformation, filtering, security, and/or privacy.

29. The apparatus of claim 18, wherein the apparatus implements subscribing to a hierarchy of services to receive messages from a plurality of services without a subscriber explicitly identifying each messaging end-point in the hierarchy.

30. The apparatus of claim 18, wherein the apparatus publishes a message of the one or more messages, records the message and searches links to identify the subscribers, and delivers the message based on the identified subscribers.

31. The apparatus of claim 18, wherein a message of the one or more messages is not forwarded when there are no active links.

32. The apparatus of claim 18, wherein the apparatus unlinks a link of the one or more links when a service does not want a message of the one or more messages.

33. The apparatus of claim 18, wherein the apparatus receives a preexisting message from a lane of one or more lanes by establishing a link in the lane after the preexisting message has been generated.

34. The apparatus of claim 18, wherein routing the one or more messages occurs in real-time.

35. A system comprising:
 a. a first device configured for:
  i. establishing one or more network connections for peer-to-peer real-time message distribution; and
  ii. routing one or more messages to an appropriate destination using the one or more network connections utilizing load balancing and routing functions, wherein when the one or more messages go to multiple subscribers on a single host, the one or more messages from a publisher are only sent once over the one or more network connections, and the one or more messages are broadcast locally without explicit involvement of a publisher and a subscriber to each subscriber of the multiple subscribers on the single host, wherein routing utilizes one or more links and one or more lanes, wherein at least one of the links is a synced link which enables the subscriber to receive the one or more messages from the publisher that existed prior to generation of the link, further wherein a lane manager for a back pressure-managed lane detects an availability signal before attempting to write the one or more messages; and
 b. a second device configured for receiving the one or more messages.

36. The system of claim 35, wherein the peer-to-peer message distribution is implemented without a centralized hub/gateway/device between the publisher and the subscriber, wherein the first device comprises the publisher, and the second device comprises the subscriber.

37. The system of claim 35, wherein an existing network connection of the one or more network connections is reused between the publisher and the subscriber transparently without involvement of application services.

38. The system of claim 35, wherein the appropriate destination is determined using universal addressing of messaging end-points.

39. The system of claim 38, wherein the universal addressing of messaging endpoints utilizes a format of a universal resource locator and a service reference.

40. The system of claim 35, wherein the first device implements self-monitoring of messaging software and regulation of the messaging software based on the self-monitoring.

41. The system of claim 40, wherein self-monitoring includes computing analysis including analyzing how long processing of a task takes and networking analysis including transfer rates.

42. The system of claim 35, wherein the first device manages back pressure by detecting subscriber message consumption, analyzing network bandwidth and analyzing network issues, and throttling message publishing based on the detecting and analyzing.

43. The system of claim 42, wherein throttling message publishing includes not publishing messages if a blockage of messages is detected.

44. The system of claim 43, wherein when a blockage of messages is detected, only a most recent message of the one or more messages is published.

45. The system of claim 35, wherein the first device utilizes one or more custom filters for message transformation, filtering, security, and/or privacy.

46. The system of claim 35, wherein the second device subscribes to a hierarchy of services to receive messages from a plurality of services without a subscriber explicitly identifying each messaging end-point in the hierarchy.

47. The system of claim 35, wherein the first device publishes a message of the one or more messages, recording the message and searching links to identify the subscribers, and delivering the message based on the identified subscribers.

48. The system of claim 35, wherein a message of the one or more messages is not forwarded when there are no active links.

49. The system of claim 35, wherein the first device unlinks a link of the one or more links when a service does not want a message of the one or more messages.

50. The system of claim 35, wherein the second device receives a preexisting message from a lane of one or more lanes by establishing a link in the lane after the preexisting message has been generated.

51. The system of claim 35, wherein routing the one or more messages occurs in real-time.

* * * * *